United States Patent
Brochhaus (10) Patent No.: US 10,532,665 B2
(45) Date of Patent: Jan. 14, 2020

(54) METHOD FOR BATTERY MANAGEMENT OF A BATTERY WITH A CHARGE STATE COMPENSATION SYSTEM AND BATTERY MANAGEMENT SYSTEM

(71) Applicants: Robert Bosch GmbH, Stuttgart (DE); Samsung SDI Co., Ltd., Yongin-si, Gyeonggi-do (KR)

(72) Inventor: Christoph Brochhaus, Aachen (DE)

(73) Assignees: Robert Bosch GmbH, Stuttgart (DE); Samsung SDI Co., Ltd., Yongin-si, Gyeonggi-do (KR)

(*) Notice: Subject to any disclaimer, the term of this patent is extended or adjusted under 35 U.S.C. 154(b) by 174 days.

(21) Appl. No.: 15/301,034

(22) PCT Filed: Mar. 20, 2015

(86) PCT No.: PCT/EP2015/055870
§ 371 (c)(1),
(2) Date: Sep. 30, 2016

(87) PCT Pub. No.: WO2015/150112
PCT Pub. Date: Oct. 8, 2015

(65) Prior Publication Data
US 2017/0021738 A1   Jan. 26, 2017

(30) Foreign Application Priority Data
Mar. 31, 2014 (DE) .................. 10 2014 205 942

(51) Int. Cl.
*H02J 7/00* (2006.01)
*H02J 7/14* (2006.01)
(Continued)

(52) U.S. Cl.
CPC .......... *B60L 11/1866* (2013.01); *B60L 53/00* (2019.02); *H02J 7/0014* (2013.01); *H02J 7/0021* (2013.01); *B60L 58/00* (2019.02)

(58) Field of Classification Search
USPC ........ 320/109, 107, 108, 112, 118, 116, 134, 320/119, 128
See application file for complete search history.

(56) References Cited

U.S. PATENT DOCUMENTS 6,184,656 B1 * 2/2001 Karunasiri ............ B60L 3/0046
180/65.8
8,060,323 B2 * 11/2011 Taniguchi .......... G01R 31/3651
320/132
(Continued)

FOREIGN PATENT DOCUMENTS

DE  10 2008 002 100 A1  11/2009
DE  10 2012 214 267 A1   3/2013
(Continued)

OTHER PUBLICATIONS

International Search Report corresponding to PCT Application No. PCT/EP2015/055870, dated Jul. 7, 2015 (German and English language document) (5 pages).

*Primary Examiner* — Alexis B Pacheco
(74) *Attorney, Agent, or Firm* — Maginot, Moore & Beck LLP (57) ABSTRACT

The disclosure relates to a method for the battery management of a battery which comprises a plurality of battery cells and which is fitted with a battery management system for monitoring battery functionality and with a charge state compensation system, wherein the battery management system comprises a plurality of sensor control devices and a main control device, said control devices being connected with one another via a communication channel, and wherein the charge state compensation system has a number of
(Continued)

charge state compensation resistors being put into operation via the sensor control devices for a charge state compensation of battery cells. The sensor control devices save information about performed charge state compensations in non-volatile memory. A computer program, a battery management system, a battery system and a motor vehicle, which are designed to carry out the method, are also described.

5 Claims, 5 Drawing Sheets

(51) Int. Cl.
*B60L 11/18* (2006.01)
*B60L 53/00* (2019.01)
*B60L 58/00* (2019.01)

(56) References Cited

U.S. PATENT DOCUMENTS

| | | | | |
|---|---|---|---|---|
| 8,736,229 | B2* | 5/2014 | Kawahara | B60L 3/0046 320/116 |
| 2010/0247988 | A1* | 9/2010 | Okumura | B60K 6/365 429/90 |
| 2012/0175953 | A1* | 7/2012 | Ohkawa | B60L 3/0046 307/18 |
| 2013/0214739 | A1* | 8/2013 | Lee | H02J 7/0016 320/118 |
| 2014/0217982 | A1* | 8/2014 | Ohkawa | H02J 7/0016 320/118 |
| 2015/0372514 | A1* | 12/2015 | Kobayashi | H01M 10/482 320/134 |

FOREIGN PATENT DOCUMENTS

| | | |
|---|---|---|
| EP | 1 042 138 A1 | 10/2000 |
| EP | 2 485 293 A1 | 8/2012 |
| EP | 10 2012 214 267 A1 | 3/2013 |
| WO | 2011/037257 A1 | 3/2011 |

\* cited by examiner

METHOD FOR BATTERY MANAGEMENT OF A BATTERY WITH A CHARGE STATE COMPENSATION SYSTEM AND BATTERY MANAGEMENT SYSTEM

This application is a 35 U.S.C. § 371 National Stage Application of PCT/EP2015/055870, filed on Mar. 20, 2015, which claims the benefit of priority to Serial No. DE 10 2014 205 942.9, filed on Mar. 31, 2014 in Germany, the disclosures of which are incorporated herein by reference in their entirety.

BACKGROUND

The present disclosure relates to a method for battery management of a battery which has multiple battery cells and which is equipped with a charge state balancing system and with a battery management system for monitoring the battery functionality. The present disclosure also relates to a computer program, a battery management system, a battery system, and a motor vehicle which are configured for carrying out the method.

Electronic control devices are increasingly being used today in the automotive field. Examples of this include engine control units and control devices for ABS or the airbag. One current research focus for electrically driven vehicles is the development of high-performance battery packs with associated battery management systems, i.e., control devices which are equipped with software for monitoring the battery functionality. Among other things, battery management systems ensure the safe and reliable function of the deployed battery cells and battery packs. They monitor and control currents, voltages, temperatures, insulation resistances, and other variables for individual cells and/or the entire battery pack. With the aid of these variables, management functions may be implemented which increase the service life, reliability, and safety of the battery system.

Battery management systems are made up of a plurality of control devices on which individual software functions run. Depending on the number of battery cells, the number of sensors, and the distribution of the battery modules across different installation spaces in the motor vehicle, a control device topology results including a main control device and multiple subordinate sensor control devices for detecting the measured value directly at the individual battery cells and battery modules. The detected data are exchanged between the control devices via a communication channel.

For balancing voltages, for example, due to unequal wear or aging of the battery cells, it is known to carry out charge state balancing (cell balancing), in which the battery cells having a high charge state are aligned with the battery cells having a low charge state. For this purpose, currents are conducted across charge state balancing resistors (so-called balancing resistors) as required, and the battery cells are discharged in a controlled manner. The primary control device determines the charge state balancing requirement. This device passes the request for carrying out the charge state balancing to the sensor control devices.

DE 10 2008 002 100 A1 demonstrates a method for charge state balancing of vehicle batteries, wherein the charge state value of the battery cells is preferably ascertained during a quiescent phase via a voltage measurement. For example, suitable points in time are considered to be immediately following an "ignition on" action or following an activation of a control device which carries out the measurement. From the charge states of the individual battery cells, an amount of charge is calculated by which each cell must be discharged until the charge state corresponds to that of the weakest battery cell.

SUMMARY

In one method according to the present disclosure, for the battery management of a battery which has multiple battery cells and which is equipped with a charge state balancing system and with a battery management system for monitoring the battery functionality, wherein the battery management system includes multiple sensor control devices and a primary control device which are interconnected via a communication channel, and wherein the charge state balancing system has a number of charge state balancing resistors which are placed into operation via the sensor control devices for charge state balancing of the battery cells, it is provided that the sensor control devices store information about implemented charge state balancing in first nonvolatile memories.

Advantageously, a history of implemented charge state balancing is maintained and stored non-centrally in the sensor control devices. In the case of a battery which has multiple battery modules and in which a sensor control device is associated with each battery module, the advantage is achieved that the information about implemented charge state balancing may be read out and analyzed during the removal of a battery module. The primary control device is not necessary for this purpose. In this way, essential information may be made accessible to external test persons in a very simple manner.

The information preferably includes frequency values of temperature changes and/or time period values of the charge state balancing, wherein this enumeration does not have to be exhaustive. This information is of considerable importance for the diagnosis of the battery. Each connection of a charge state balancing resistor results in heating of the same after only a short period. After disconnection, the charge state balancing resistor cools down again. The number of temperature changes affects the service life of the components, in particular the solder joints, which are stressed by the temperature changes.

The following clearly shows that the number of temperature changes does not have to correspond to the total amount of implemented charge state balancing: There are numerous factors which influence the charge state balancing, for example, the temperature of the components involved, in particular the temperature of the battery cell, as well as a possible undervoltage of a battery cell. In some cases, these factors cause unplanned cancellations of the charge state balancing, for example, due to overtemperature of the charge state balancing resistor. If the charge state balancing resistor again cools down below a threshold value, the charge state balancing is resumed as necessary. The aforementioned factors have a direct influence on the duration of the charge state balancing or the number of temperature changes. The provided method very effectively manages the information about temperature changes and the activation period of all integrated charge state balancing resistors.

It has been found that the relevant information about the charge state balancing does not constitute critical data; therefore, the primary control device does not necessarily have to have this information ready at the start of a driving cycle. In one preferred specific embodiment, the primary control device ascertains the charge state balancing requirement of the battery cells at the end of a driving cycle, communicates it to the sensor control devices, and deactivates them thereafter. The information about implemented charge state balancing may now be detected only by the sensor control devices, since only the software running on these control devices is able to detect the full information about the duration and course of the charge state balancing and the temperature changes. The primary control device is deactivated during the charge state balancing and is not able to gather any information in this regard. The sensor control devices carry out the charge state balancing autonomously and manage the information about the implemented charge state balancing. In the provided concept, only the information about the usage of the charge state balancing resistors during the driving cycle from the penultimate driving cycle is typically available to the primary control device.

Events triggering a start and an end of a driving cycle may, for example, include charging pulses, a change of state of the battery from "drive" to "charge", analysis of a "charge active" signal, or an analysis of a change of state of an ignition signal.

According to one specific embodiment, the information about implemented charge state balancing which is stored in the nonvolatile memory of the sensor control devices is transmitted to the primary memory device at the end of a driving cycle. As a result, in particular a delay of the system start is avoided. Alternatively, it may be provided to transmit the information about implemented charge state balancing within, i.e., interleaved with, the further communication between the sensor control devices and the primary control device. For transmitting the data, free communication bandwidth is used as soon as it is available. As a result, the starting process of the primary control devices is not delayed; advantageously, the information is available to the primary control device earlier.

According to one specific embodiment, the primary control device stores the information about implemented charge state balancing in a second nonvolatile memory. In this case, an overall histogram is formed in the primary control device, which allows a comprehensive overview of the usage of the charge state balancing resistors. Within the scope of warranty claims, the overall histogram may be read out of the nonvolatile memory of the primary control device and used for analyzing the usage of the charge state balancing system.

According to one specific embodiment, during an exchange of battery cells, battery modules, and the associated sensor control device, the primary control device updates the information about implemented charge state balancing, for example, in the form of a reset of the affected units, in particular memory units.

According to the present disclosure, furthermore, a computer program is provided, according to which one of the methods described herein is carried out, if the computer program is executed on a programmable computer device. The computer program may, for example, be a software module, a software routine, or a software subroutine for implementing a battery management system of a motor vehicle. The computer program may be stored on a machine-readable storage medium, for example, on a permanent or rewritable storage medium or in association with a computer device, for example, on a portable memory such as a CD-ROM, a DVD, a Blu-Ray disc, a USB stick, or a memory card. In addition or alternatively, the computer program may be provided on a computer device, for example, on a server or a cloud server, for downloading, for example, via a data network such as the Internet, or via a communication connection such as a telephone line or a wireless connection.

According to the present disclosure, a battery management system is provided for monitoring the battery functionality of a battery which has multiple battery cells and is equipped with a charge state balancing system, wherein the battery management system includes multiple sensor control devices and a primary control device which are interconnected via a communication channel, and wherein the charge state balancing system has a number of charge state balancing resistors which are placed into operation via the sensor control devices for charge state balancing of the battery cells. In this case, it is provided that the sensor control devices have first nonvolatile memories and charge state balancing control units, wherein the charge state balancing control units are configured for storing information about implemented charge state balancing in the first nonvolatile memories.

Preferably, the battery management system is designed and/or configured for carrying out the method described herein. Accordingly, the features described within the scope of the method correspondingly apply to the battery management system, and reciprocally, the features described within the scope of the battery management system correspondingly apply to the method.

The units of the battery management system may be understood to be functional units which are not necessarily physically separate. Thus, multiple units of the battery management system may be implemented in a single physical unit, for example, if multiple functions are implemented in software. Furthermore, the units of the battery management system may also be implemented in hardware, for example, via application-specific integrated circuits (ASICs) or in memory units. Preferably, in particular units for ascertaining and storing the information about charge state balancing are implemented in the battery management system as software or ASICs.

According to the present disclosure, in addition, a battery system is provided including a battery which includes multiple battery cells and a charge state balancing system, and including such a battery management system. The battery may in particular be a lithium-ion battery or a nickel-metal hybrid battery and may be connectable to a drive system of a motor vehicle.

In the present description, the terms "battery" and "battery unit" are adapted to the conventional linguistic usage and used for accumulators and accumulator units. The battery includes one or multiple battery units, whereby a battery cell, battery module, a module string, or a battery pack may be indicated. In the battery, the battery cells are preferably spatially combined and interconnected in terms of circuitry, for example, in series or in parallel into modules. Multiple modules may form so-called battery direct converters (BDCs), and multiple battery direct converters may form a battery direct inverter (BDI). Preferably, the battery has multiple battery modules, wherein exactly one sensor control device is associated with each battery module.

According to the present disclosure, in addition, a motor vehicle including such a battery system is provided, wherein its battery is connected to a drive system of the motor vehicle. The motor vehicle may be designed as a pure electric vehicle and exclusively include an electric drive system. Alternatively, the motor vehicle may be designed as a hybrid vehicle which includes an electric drive system and an internal combustion engine. In some variants, it may be provided that the battery of the hybrid vehicle may be charged internally with surplus energy from the internal combustion engine via a generator. Plug-in hybrid electric vehicles (PHEVs) additionally provide the option of charging the battery via the external electrical grid. In the case of motor vehicles designed in such a way, the driving cycle includes driving operation and/or charging operation as operating phases.

The method according to the present disclosure and the battery management system provide information about the usage of the charge state balancing system, in particular about the usage of the charge state balancing resistors, wherein a possible exchange of battery modules and/or sensor control devices is also taken into account. The information about the implemented charge state balancing is permanently stored in the sensor control devices, in order to be able to read them out and analyze them when they are removed.

It is particularly advantageous that such information is also collected if the primary control device is deactivated, for example, following a driving cycle.

BRIEF DESCRIPTION OF THE DRAWINGS

Exemplary embodiments of the present disclosure are depicted in the drawings and are described in greater detail in the following description.

In the following description of the exemplary embodiments of the present disclosure, identical or similar components are depicted having identical or similar reference numerals; therefore, a repeated description of these components will be omitted in individual cases. The figures depict the subject matter of the disclosure only schematically.

DETAILED DESCRIPTION

Figure 1:
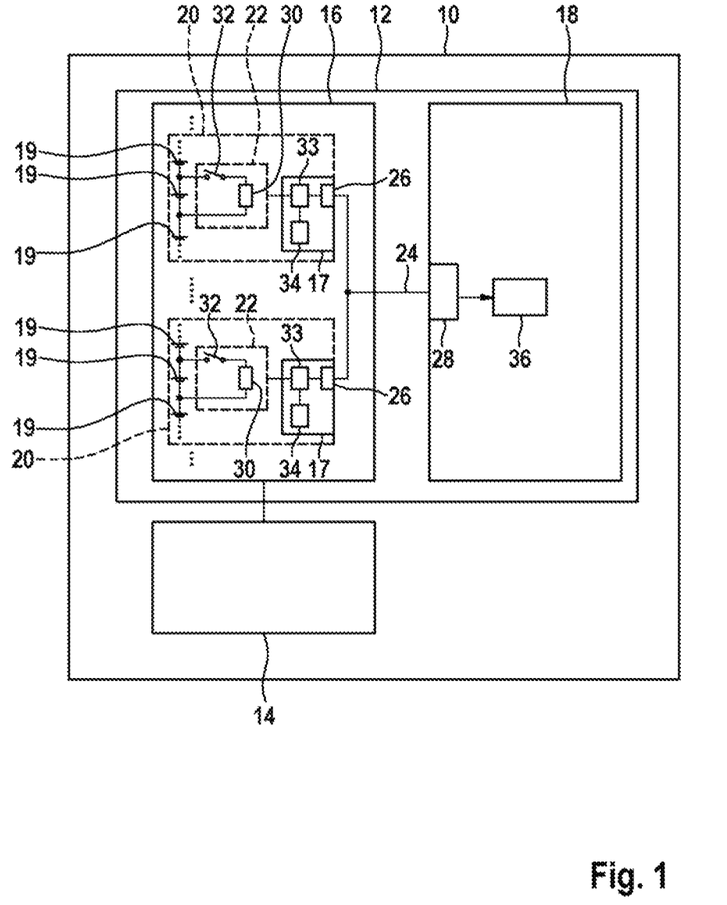
FIG. 1 shows a motor vehicle including a battery system.

FIG. 1 shows an at least partially electrically driven motor vehicle 10 including a battery system 12.

The motor vehicle 10 of FIG. 1 may be designed as a purely electrically driven vehicle or as a hybrid vehicle which additionally has an internal combustion engine. In addition, the motor vehicle 10 is equipped with an electric drive system 14, which drives the motor vehicle 10 via an electric motor (not shown) at least partially electrically.

The electrical energy is provided by a battery 16. The battery 16 includes multiple battery cells 19 or accumulator cells, for example, lithium-ion cells having a voltage range from 2.8 V to 4.2 V. The battery cells 19 are combined in groups into battery modules 20 and connected in series and partially also in parallel, in order to achieve the required power and energy data via the battery 16.

The battery 16 is part of a battery system 12, which in addition includes a battery management system. The battery management system includes a primary control device 18 and multiple sensor control devices 17 which are associated with the battery modules 20.

The primary control device 18 and the sensor control devices 17 are connected via a communication channel 24, for example, an SPI (serial peripheral interface) bus or a CAN (controller area network) bus, via which cell monitoring units and module monitoring units (not shown) generally detect operating parameters such as voltages, current strengths, or temperatures of individual battery cells 19 or individual battery modules 20 as measured values and provide them to the primary control device 18 for monitoring and controlling the battery functionality. For communication, communication units 26, 28 are associated with the battery modules 20 and the primary control device 18.

The battery 16, i.e., in the depicted exemplary embodiment, each battery module 20, has a charge state balancing system 22, which carries out resistive charge state balancing in the depicted exemplary embodiment. For this purpose, a switch 32 and a charge state balancing resistor 30 are associated with each battery cell 19, wherein the switch 32 may be actuated by the sensor control device 17. However, the present disclosure is not limited to this exemplary embodiment, but may be used in inductive or capacitive charge state balancing methods.

Each sensor control device 17 includes the communication unit 26 and a charge state balancing control unit 33. The charge state balancing control unit 33 is configured to record information from implemented charge state balancing, in particular the number of temperature changes and the cumulative duration of the charge state balancing, and to store it in a first nonvolatile memory 34. The first nonvolatile memory 34 is, for example, an EEPROM (electrically erasable programmable read-only memory), in which the information is permanently stored.

The primary control device 18 includes a second nonvolatile memory 36, in which the information about implemented charge state balancing which is ascertained and stored by the sensor control devices 17 is permanently stored.

Figure 2A:
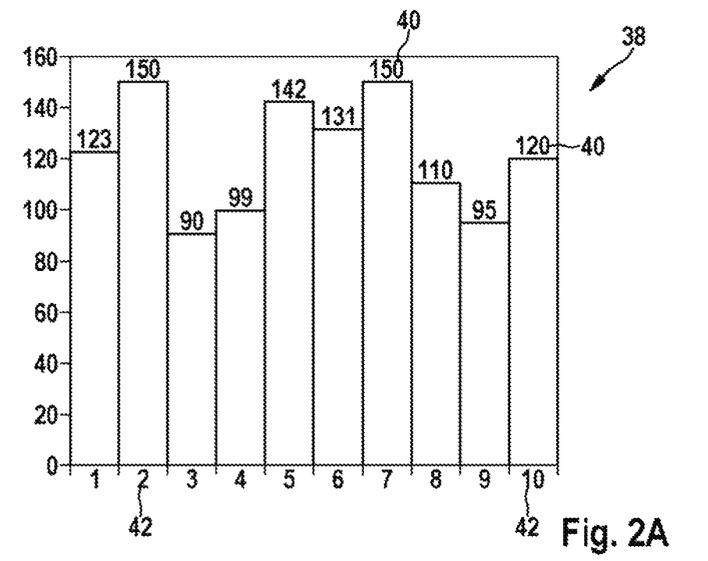
FIGS. 2A to 2D show histograms of sensor control devices.
Figure 2B:
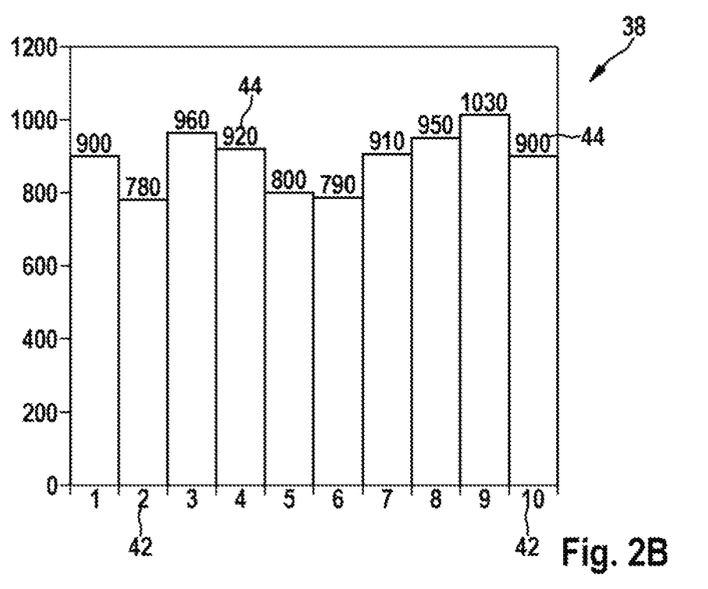
Figure 2C:
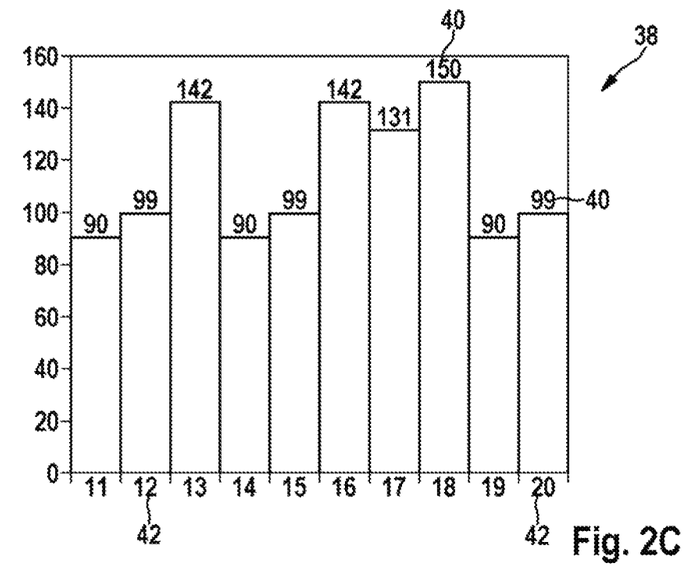
Figure 2D:
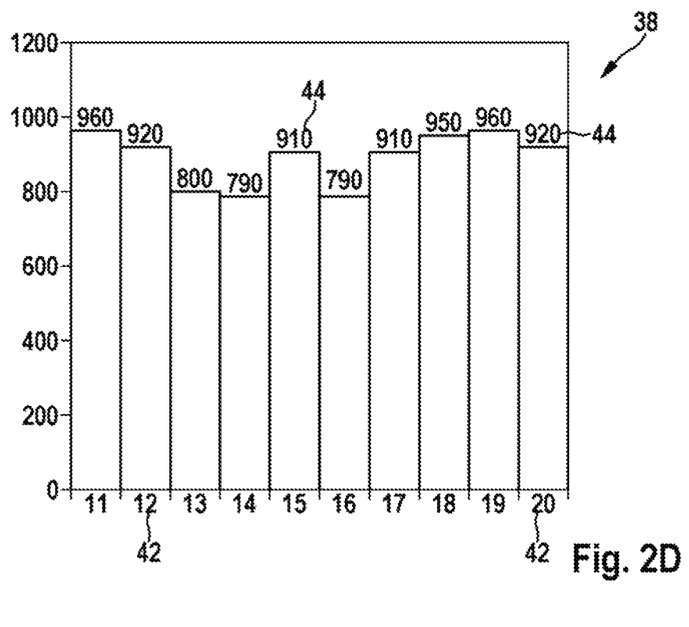

FIGS. 2A to 2D show histograms 38, FIG. 2A and FIG. 2B being associated with a first sensor control device 17, and FIG. 2C and FIG. 2D being associated with a second sensor control device 17. The histograms represent the information stored by the sensor control devices 17 from implemented charge state balancing. The information depicted in FIGS. 2A to 2D may be read out of the first nonvolatile memories 34 of the sensor control devices 17 and analyzed.

The histogram 38 in FIG. 2A represents a measured number of temperature changes for each charge state balancing resistor 30. For this purpose, frequency values 40 are plotted above identifiers 42 of the charge state balancing resistors 30.

FIG. 2B depicts the cumulative duration of charge state balancing for the charge state balancing resistors 30. For this purpose, time period values 44 are plotted above the identifiers 42 of the charge state balancing resistors 30.

FIG. 2C and FIG. 2D depict the corresponding information about the number of temperature changes and the cumulative duration of the charge state balancing for charge state balancing resistors 30 of the second sensor control device 17.

Figure 3A:
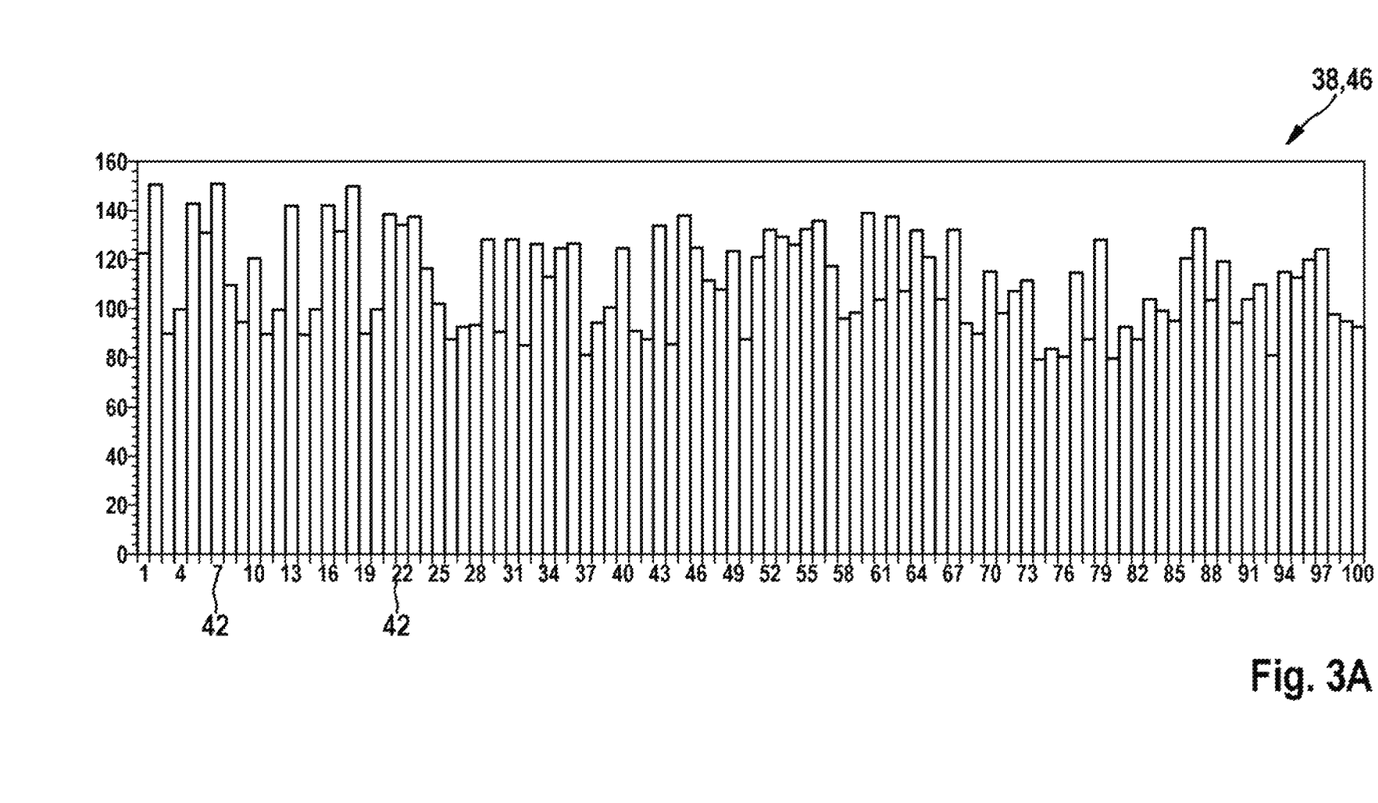
FIGS. 3A and 3B show histograms of a primary control device.
Figure 3B:
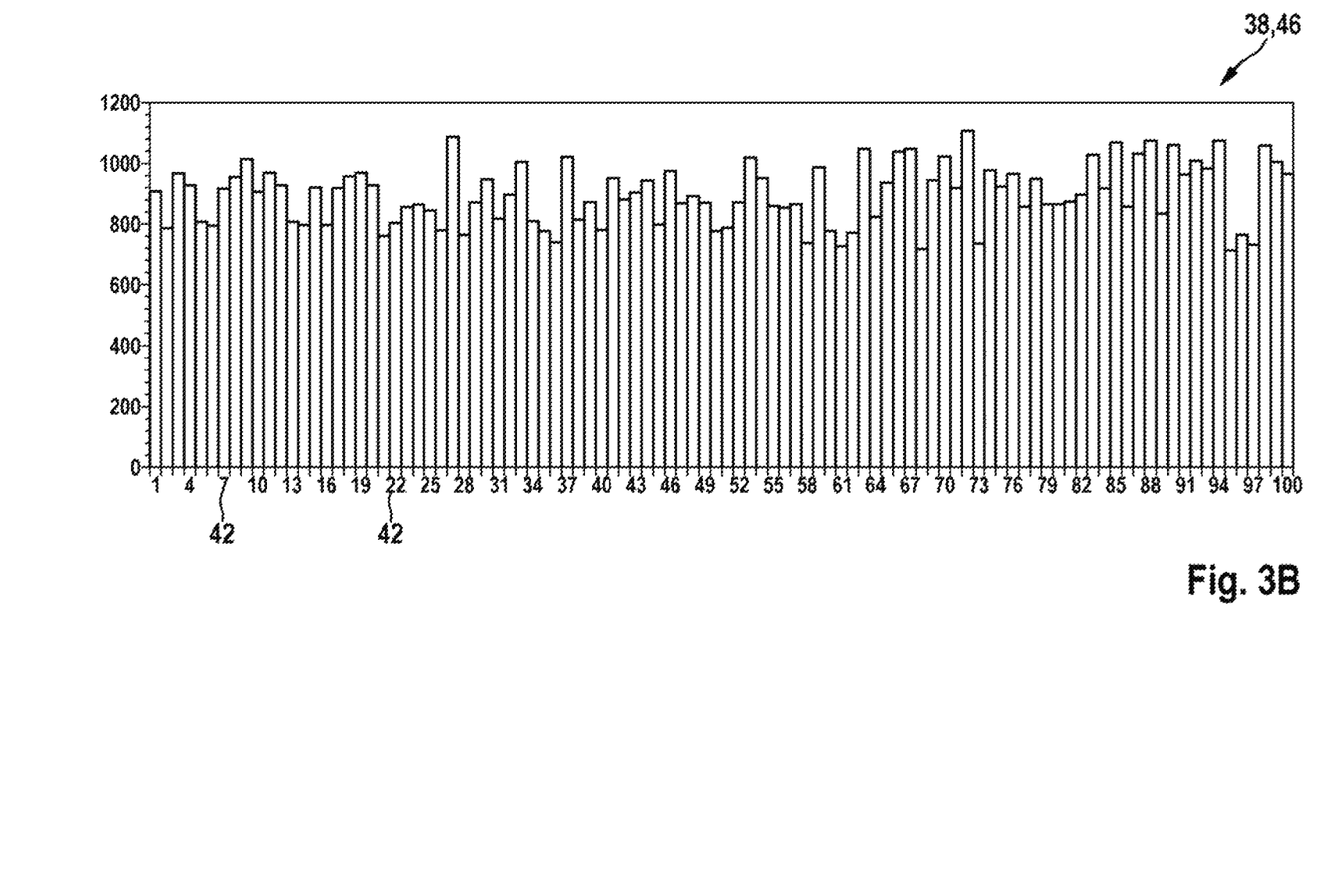

FIG. 3A and FIG. 3B depict information about the number of temperature changes and the cumulative duration of the charge state balancing of all charge state balancing resistors 30 of the battery 16. The identifiers 42 of the individual charge state balancing resistors 30 are unambiguously assigned within the battery 16, The information in the primary control device 18 forms overall histograms 46, which may be read out of the second nonvolatile memory 36 of the primary control device 18 and analyzed.

In practice, a method may be implemented as follows:

At the beginning of the driving cycle, the primary control device 18 powers up. The information about the charge state balancing resistors 30 in the primary control device 18 originates from the penultimate driving cycle during normal operation, since the information about the charging state balancing following the last driving cycle is only transmitted by the sensor control devices 17 following the driving cycle.

At the end of the driving cycle, the primary control device 18 requests the current state of the usage information of the charge state balancing resistors 30 from the sensor control devices 17. Subsequently, the primary control device 18 sends the command for carrying out the charge state balancing to the sensor control devices 17 and deactivates itself. If the primary control device 18 is deactivated, the charge state balancing is carried out by the sensor control devices 17 autonomously.

At the end of the next driving cycle, the primary control device 18 in turn requests the current state of the usage information of the charge state balancing resistors 30 from the sensor control devices 17. In this case, as after the previous driving cycle, the information is stored in the first nonvolatile memory of the sensor control devices 17 and transmitted thereafter. Subsequently, the primary control device 18 in turn sends the command for carrying out the charge state balancing to the sensor control devices 17 and deactivates itself. If the primary control device 18 is deactivated, the request is carried out autonomously.

The present disclosure is not limited to the exemplary embodiments described here and the aspects emphasized therein. Rather, within the framework indicated by the disclosure, a plurality of modifications is possible, which are within the capabilities of those skilled in the art.

The invention claimed is:

1. A method for battery management of a battery, the battery having a plurality of battery cells, a charge state balancing system, and a battery management system, the method comprising:
   monitoring operating parameters of the plurality of battery cells with the battery management system, the battery management system including a plurality of sensor control devices and a primary control device which are interconnected via a communication channel;
   operating, with the sensor control devices, a plurality of charge state balancing resistors of the charge state balancing system to balance charge states of the battery cells; and
   detecting, with the sensor control devices, and storing, in first nonvolatile memories of the sensor control devices, (i) a total number of temperature changes of each charge state balancing resistor in the plurality of charge state balancing resistors and (ii) a cumulative duration of charge state balancing performed with each charge state balancing resistor in the plurality of charge state balancing resistors; and
   resetting to zero, with the primary control device, (i) the total number of temperature changes of a respective charge state balancing resistor in the plurality of charge state balancing resistors and (ii) the cumulative duration of charge state balancing performed with a respective charge state balancing resistor in the plurality of charge state balancing resistors in response to a replacement of the respective charge state balancing resistor.

2. The method as claimed in claim 1, further comprising:
   ascertaining, with the primary control device, a charge state balancing requirement of the battery cells at an end of a driving cycle;
   communicating the charge state balancing requirement to the sensor control devices; and
   deactivating the primary control device after communicating the charge state balancing requirement and before operating the plurality of charge state balancing resistors of the charge state balancing system to balance charge states of the battery cells.

3. The method as claimed in claim 1, further comprising:
   transmitting, with the sensor control devices, (i) the total number of temperature changes of each charge state balancing resistor in the plurality of charge state balancing resistors and (ii) the cumulative duration of charge state balancing performed with each charge state balancing resistor in the plurality of charge state balancing resistors to the primary control device at an end of a driving cycle.

4. The method as claimed in claim 3, further comprising:
   storing, in a second nonvolatile memory of the primary control device, (i) the total number of temperature changes of each charge state balancing resistor in the plurality of charge state balancing resistors and (ii) the cumulative duration of charge state balancing performed with each charge state balancing resistor in the plurality of charge state balancing resistors.

5. A computer program for a battery management system of a battery, the battery having a plurality of battery cells and a charge state balancing system, the computer program configured to, when executed on a the battery management system:
   monitor operating parameters of the plurality of battery cells of the battery with the battery management system, the battery management system including a plurality of sensor control devices and a primary control device which are interconnected via a communication channel;
   operate, with the sensor control devices, a plurality of charge state balancing resistors of the charge state balancing system to balance charge states of the battery cells;
   detect, with the sensor control devices, and store, in first nonvolatile memories of the sensor control devices, (i) a total number of temperature changes of each charge state balancing resistor in the plurality of charge state balancing resistors and (ii) a cumulative duration of charge state balancing performed with each charge state balancing resistor in the plurality of charge state balancing resistors; and
   resetting to zero, with the primary control device, (i) the total number of temperature changes of a respective charge state balancing resistor in the plurality of charge state balancing resistors and (ii) the cumulative duration of charge state balancing performed with a respective charge state balancing resistor in the plurality of charge state balancing resistors in response to a replacement of the respective charge state balancing resistor.

* * * * *

UNITED STATES PATENT AND TRADEMARK OFFICE
CERTIFICATE OF CORRECTION

PATENT NO. : 10,532,665 B2
APPLICATION NO. : 15/301034
DATED : January 14, 2020
INVENTOR(S) : Christoph Brochhaus

Page 1 of 1

It is certified that error appears in the above-identified patent and that said Letters Patent is hereby corrected as shown below:

In the Claims

In Claim 1, at Column 7, Lines 42-43: "the battery cells; and" should read --the battery cells;--.

Signed and Sealed this
Twenty-first Day of April, 2020

Andrei Iancu
*Director of the United States Patent and Trademark Office*